Patented Jan. 23, 1951

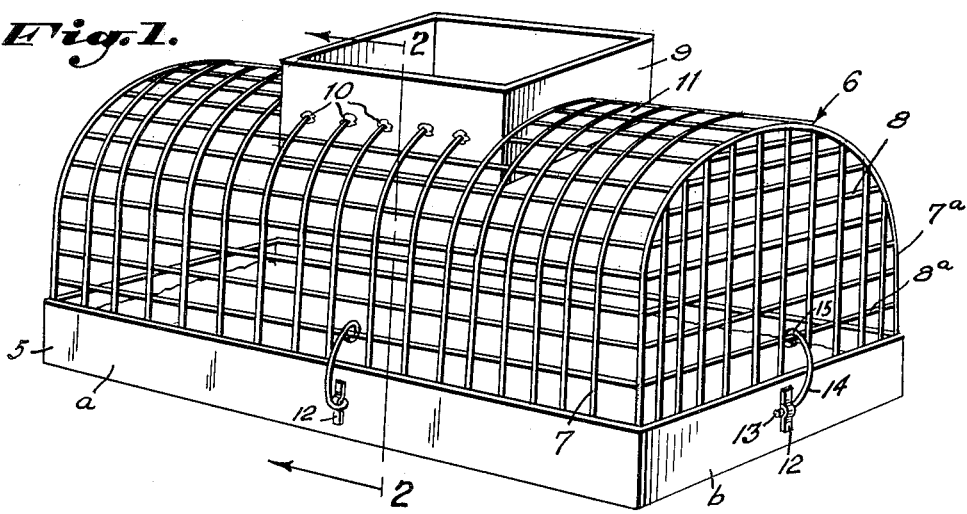
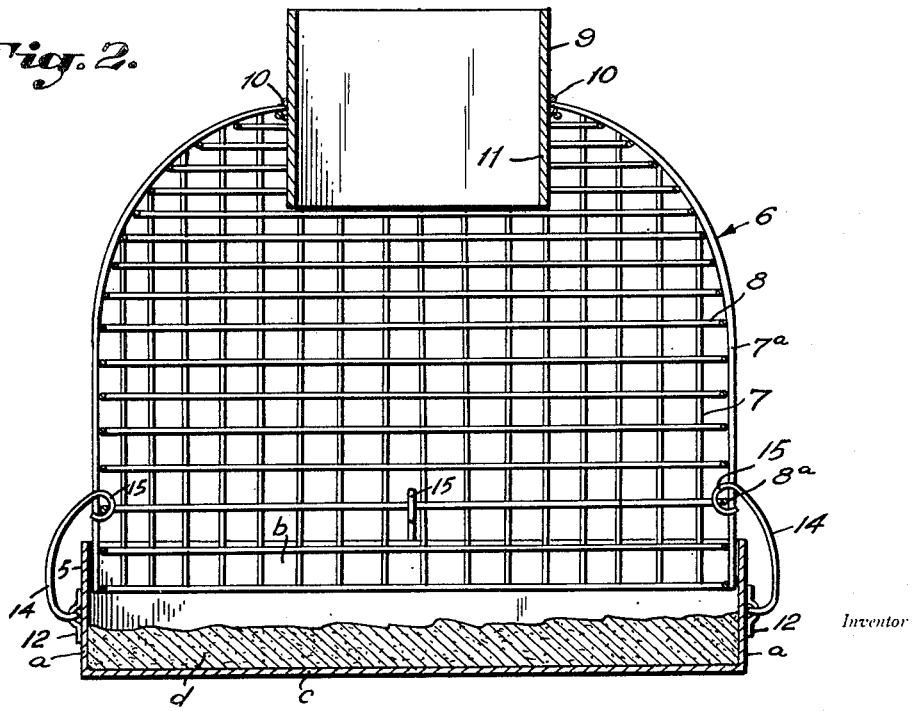

2,539,024

UNITED STATES PATENT OFFICE 2,539,024

ESCAPEPROOF ANIMAL CAGE

Howard L. Leiby, Florin, Pa.

Application February 11, 1949, Serial No. 75,831

1 Claim. (Cl. 119—17)

This invention relates to improvements in the art of animal husbandry and more particularly to an improved animal cage for containing hamsters, small rabbits, white mice, turtles, etc.

An important object of the invention is to provide an escapeproof animal trap, which will allow for a clear view of the caged animals at all times, this fact being promoted by the absence of doors or gates in the side or end walls of the cage.

Another object of the invention is to provide an escapeproof animal cage which dispenses with doors or gates in the side walls thereof, but affords access to the cage, through a baffle provided hatch in the top thereof.

Another object of the invention is to provide an improved cage which can be readily disassembled when cleaning thereof becomes necessary.

Still another object of the invention is to provide an escapeproof animal cage, which can be readily detached from its droppings box and placed on a lawn or other grass surface, to permit the animals to be directly on the ground.

Still a further object of the invention is to provide a cage of the character stated which can be manufactured at a cost no greater than the present day cages, while offering certain outstanding advantages thereover.

These and various other objects and advantages of the invention will become apparent to the reader of the following description.

In the drawing:

Figure 1 is a perspective view of the assembled cage;

Figure 2 is an enlarged cross sectional view taken on line 2—2 of Figure 1.

Referring to the drawing wherein like numerals designate like parts, it can be seen that numeral 5 denotes a droppings box having side walls $a$ and end walls $b$, as well as a bottom wall $c$ upon which earth or ashes $d$ may be placed to absorb moisture.

Numeral 6 generally refers to the cage proper which is of mesh of the required gauge, the same being made up of side walls 7, the vertical members 7a of which are curved over the top as shown in Figure 1 and the cage also has an end wall 8 of mesh and the curved top of this cage has a rectangular shaped opening therein for receiving a rectangular shaped wall structure 9, this wall structure preferably being of sheet metal and welded as at 10 to the wires of the cage. This rectangular shaped wall is open both at its top and bottom and depends for approximately one-half of its vertical measurement into the cage, this portion forming an animal baffle 11, the upwardly extending portion of the wall comprising a guard against entrance of unwanted animals into the cage, thus preventing mixing and contamination of animals in the cage with other animals.

On the side walls $a$ and end walls $b$ are keepers 12 into which the laterally disposed end portions 13 of hook members 14 are disposed, the hooks being curved inwardly as shown in Figure 2, and engage over and under certain horizontal wires 8a of the cage mesh. In other words, it can be seen that these hooks have open ring-like hooks 15, which engage the cage members 8a and support the cage in an elevated position above the bottom $c$ of the droppings box 5, thus maintaining the lower edge of the cage away from the material $d$.

In the use and operation of this cage, it can be seen that with the cage proper and droppings box assembled in the manner shown in Figure 2, hamsters or other animals can be placed in the cage through the wall 9. Once in the cage, the animals cannot escape. Even animals like hamsters that are very proficient at crawling and escaping, cannot depart from the cage because if they do climb the side or end walls of the cage, they are blocked against escape through the wall 9 by the presence of the apron or depending baffle portion 11 of the wall.

While the foregoing description sets forth the invention in specific terms, it is to be understood that numerous changes in the shape, size and materials may be resorted to, without departing from the spirit and scope of the invention, as claimed hereinafter.

Having described the invention, what is claimed as new is:

A cage of the character described comprising a mesh cage body having a rectangular opening in the top thereof and dimensioned to admit the hand of an attendant, a continuous wall structure disposed through the opening in the top of the cage body and depending a substantial distance into the cage to define a baffle, said wall being rectangular in horizontal cross-section and having integral contact with those portions of the mesh cage defining said opening, said wall structure extending a substantial distance above said top and comprising a guard against entry of unwanted animals into the cage.

HOWARD L. LEIBY.

REFERENCES CITED

The following references are of record in the file of this patent:

UNITED STATES PATENTS

| Number | Name | Date |
|---|---|---|
| 149,918 | Clough | Apr. 21, 1874 |
| 514,388 | Smith | Feb. 6, 1894 |
| 639,246 | Kagarier | Dec. 19, 1899 |
| 1,545,671 | Lindeman | July 4, 1925 |
| 1,605,247 | Leon | Nov. 2, 1926 |
| 1,688,502 | Leon | Oct. 23, 1928 |
| 2,252,908 | Witlief | Aug. 19, 1941 |